No. 736,310. PATENTED AUG. 11, 1903.
J. A. SWEARER & C. E. TOYNBEE.
METHOD OF MAKING WIRE GLASS.
APPLICATION FILED MAY 23, 1902.
NO MODEL.
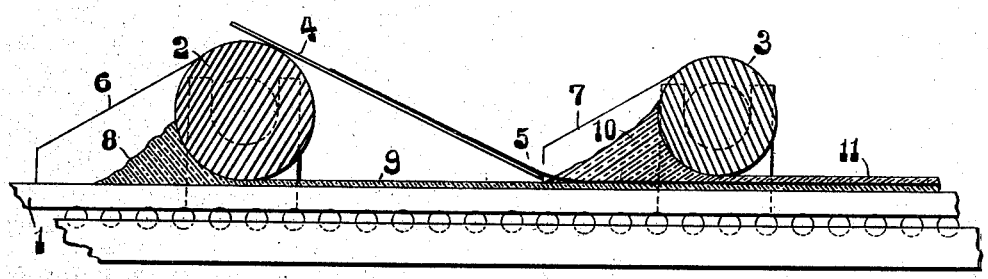
WITNESSES
Geo. H. Harvey.
F. N. Barber.
INVENTORS,
James A. Swearer and
Charles E. Toynbee,
by Wm L. Pierce
their Attorney.

No. 736,310.

Patented August 11, 1903.

UNITED STATES PATENT OFFICE.

JAMES A. SWEARER, OF BEAVER, AND CHARLES E. TOYNBEE, OF PORT ALLEGHENY, PENNSYLVANIA, ASSIGNORS, BY MESNE ASSIGNMENTS, TO THE MISSISSIPPI WIRE GLASS COMPANY, OF JERSEY CITY, NEW JERSEY, A CORPORATION OF NEW JERSEY.

METHOD OF MAKING WIRE-GLASS.

SPECIFICATION forming part of Letters Patent No. 736,310, dated August 11, 1903.

Application filed May 23, 1902. Serial No. 108,626. (No specimens.)

*To all whom it may concern:*

Be it known that we, JAMES A. SWEARER, residing at Beaver, in the county of Beaver, and CHARLES E. TOYNBEE, residing at Port Allegheny, in the county of Allegheny, State of Pennsylvania, citizens of the United States, have invented or discovered new and useful Improvements in Methods of Making Glassware, of which the following is a specification.

The figure shows in longitudinal section one form of apparatus for making wire-glass by our method.

Our invention relates to the manufacture of glass with a wire-netting or trellis embedded therein.

It has been proposed to start the first layer with the wire embedded in the top thereof and then pour and roll the second layer on the first as soon as the leading-roll has passed sufficiently far to permit the second pouring. In this process the trellis is embedded in the first layer simultaneously with its formation and while this layer is still too fluid to support the trellis without its becoming embedded. To the first layer in substantially this condition the second layer is applied, the trellis being between the two layers of glass before either has become set or chilled to any appreciable degree.

By our method the trellis is not applied until the first layer will support it. We embed the trellis in the under side of the upper layer and apply the two to the set or chilled surface of the first layer.

In the drawing, 1 represents the casting-bed, 2 the leading-roll, and 3 the finishing-roll. 4 is a chute for the trellis 5 and terminates a short distance behind the finishing-roll 3. 6 and 7 are the usual knives or guides for the melted glass.

The operation is as follows: A batch of glass is poured behind the leading-roll 2 at 8, and the table 1 is moved to the right, a sheet or layer 9 of glass being formed. A second pouring of glass is made at 10 behind the roll 3. When the advanced end of the sheet 9 reaches the second pouring, the trellis is introduced in front of the pouring and the roll 3 rolls out on top of the sheet 9 a second layer with the trellis embedded in the latter. The second layer with the trellis is not applied until the first layer is sufficiently hard to permit the trellis to lie on its surface without being embedded therein or until after the first layer has been completed.

It is clear that the table may be stationary, while the rolls with their knives and the chute may be movable, the process being the same in either case.

It is to be noted that by our process the trellis is not exposed to the oxidizing action of the air after it has been assembled with the glass, as is the case where the trellis is embedded in the first layer by the leading-roll. When the trellis is thus embedded with its upper incandescent surface exposed to the air in the space between the leading-roll and the second pouring of glass, its upper surface is dark with scale and its life is burned out and its utility impaired. Furthermore, during the interval from the time the embedded trellis leaves the first roll until it arrives at the second pouring the trellis becomes melted, and as it enters the second pouring the melted metal smears the glass, rendering it unsightly.

If the second pouring is made before the first layer is sufficiently hard, as is done when the second pouring is made as soon as possible after the leading-roll has passed, the trellis will not be rigidly held in the first layer when the second layer is applied, the result being that the trellis is distorted and its level disturbed.

Having described our invention, what we claim is—

1. The method of making wire-glass sheets which consists in rolling the lower half of the sheet, and, after the same has become sufficiently hard to support the trellis, rolling the second half of the sheet and simultaneously applying the trellis embedded in the latter.

2. The method of making wire-glass sheets which consists in rolling the lower half of the sheet in substantially a horizontal position, and then rolling thereon the second sheet and simultaneously applying the trellis thereto.

3. The method of making wire-glass sheets which consists in rolling the lower half of the sheet, and after the sheet has become sufficiently hard to support the trellis rolling the second half and simultaneously applying the trellis introduced therein between the rolls.

4. The method of making wire-glass sheets which consists in rolling the lower half of the sheet, then rolling the second half thereof and simultaneously feeding the trellis through the second pouring, so that it is embedded in the second half.

Signed at Pittsburg, Pennsylvania, this 21st day of May, 1902.

JAMES A. SWEARER.
CHARLES E. TOYNBEE.

Witnesses:
F. N. BARBER,
GEO. H. HARVEY.